(12) United States Patent
Gunderson et al.

(10) Patent No.: US 7,740,678 B2
(45) Date of Patent: Jun. 22, 2010

(54) HIGH CAPACITY FILTER

(75) Inventors: Larry T. Gunderson, Sun Prairie, WI (US); Scott W. Schwartz, Cottage Grove, WI (US); Scott P. Heckel, Stoughton, WI (US); Brad Henke, Madison, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 197 days.

(21) Appl. No.: 11/834,905

(22) Filed: Aug. 7, 2007

(65) Prior Publication Data

US 2009/0038276 A1 Feb. 12, 2009

(51) Int. Cl.
*B01D 46/00* (2006.01)

(52) U.S. Cl. .............. 55/484; 55/498; 55/510; 210/342; 210/487

(58) Field of Classification Search .............. 55/482, 55/484, 497, 498, 508, 510; 210/338, 342, 210/487, 497.01
See application file for complete search history.

(56) References Cited

U.S. PATENT DOCUMENTS

| | | | | |
|---|---|---|---|---|
| 3,361,260 A | * | 1/1968 | Buckman | 210/130 |
| 3,370,708 A | * | 2/1968 | Hultgren et al. | 210/130 |
| 3,420,377 A | * | 1/1969 | Vandersip | 210/315 |
| 3,494,114 A | * | 2/1970 | Nelson et al. | 55/482 |
| 3,988,244 A | * | 10/1976 | Brooks | 210/317 |
| 4,135,899 A | | 1/1979 | Gauer | |
| 4,235,611 A | | 11/1980 | Brownell | |
| 4,261,710 A | | 4/1981 | Sullivan | |
| 4,317,727 A | * | 3/1982 | Meissner | 210/315 |
| 4,507,200 A | * | 3/1985 | Meissner | 210/315 |
| 4,714,546 A | * | 12/1987 | Solomon et al. | 210/137 |
| 4,948,398 A | * | 8/1990 | Thomaides et al. | 95/286 |
| 5,152,890 A | * | 10/1992 | Linnersten | 210/315 |
| 5,320,653 A | | 6/1994 | Morgan et al. | |
| 5,431,706 A | | 7/1995 | Paas | |
| 5,730,769 A | * | 3/1998 | Dungs et al. | 55/385.3 |
| 6,149,700 A | | 11/2000 | Morgan et al. | |
| 6,258,144 B1 | * | 7/2001 | Huang | 55/385.3 |
| 6,261,334 B1 | | 7/2001 | Morgan et al. | |
| 6,383,244 B1 | | 5/2002 | Wake et al. | |
| 6,391,076 B1 | | 5/2002 | Jaroszczyk et al. | |
| 6,402,798 B1 | | 6/2002 | Kallsen et al. | |
| 6,416,561 B1 | | 7/2002 | Kallsen et al. | |
| 6,511,599 B2 | | 1/2003 | Jaroszczyk et al. | |
| 6,641,637 B2 | | 11/2003 | Kallsen et al. | |
| 6,958,083 B1 | | 10/2005 | Schmitz et al. | |
| 7,452,395 B2 | * | 11/2008 | Fiello et al. | 55/385.3 |
| 7,597,734 B2 | * | 10/2009 | Johnson et al. | 55/482 |
| 7,635,429 B2 | * | 12/2009 | Bauder et al. | 210/338 |
| 2002/0170852 A1 | | 11/2002 | Reinhardt | |
| 2004/0255783 A1 | | 12/2004 | Graham et al. | |
| 2006/0037906 A1 | | 2/2006 | Assion | |
| 2007/0080104 A1 | | 4/2007 | Rautio | |
| 2007/0125698 A1 | | 6/2007 | Merritt et al. | |

* cited by examiner

*Primary Examiner*—Michael A Marcheschi
*Assistant Examiner*—Robert A Clemente
(74) *Attorney, Agent, or Firm*—Andrus, Sceales, Starke & Sawall, LLP; J. Bruce Schelkopf

(57) ABSTRACT

A filter element has first and second subelements providing increased media providing improved performance and packaging options. The first and second subelements provide first and second flow paths in parallel with each other along designated flow path portions.

1 Claim, 7 Drawing Sheets

HIGH CAPACITY FILTER

BACKGROUND AND SUMMARY

The invention relates to filters, and more particularly high capacity filters.

Extended service intervals and lower filter restriction are two key performance parameters of a filtration system, including air filtration. The market also demands improved packaging options. Increased filter performance can provide similar performance in a smaller package size, or improved performance in similar sizes. It is further desirable to provide an improved performance filter element while allowing the use of a standard filter housing. This allows an end-user to select between a standard filter element version or a higher performance version, and use either version in a standard filter housing provided by the OEM (original equipment manufacturer).

The present invention arose during continuing development efforts directed toward improved filter performance as noted above.

DETAILED DESCRIPTION

Figure 1:
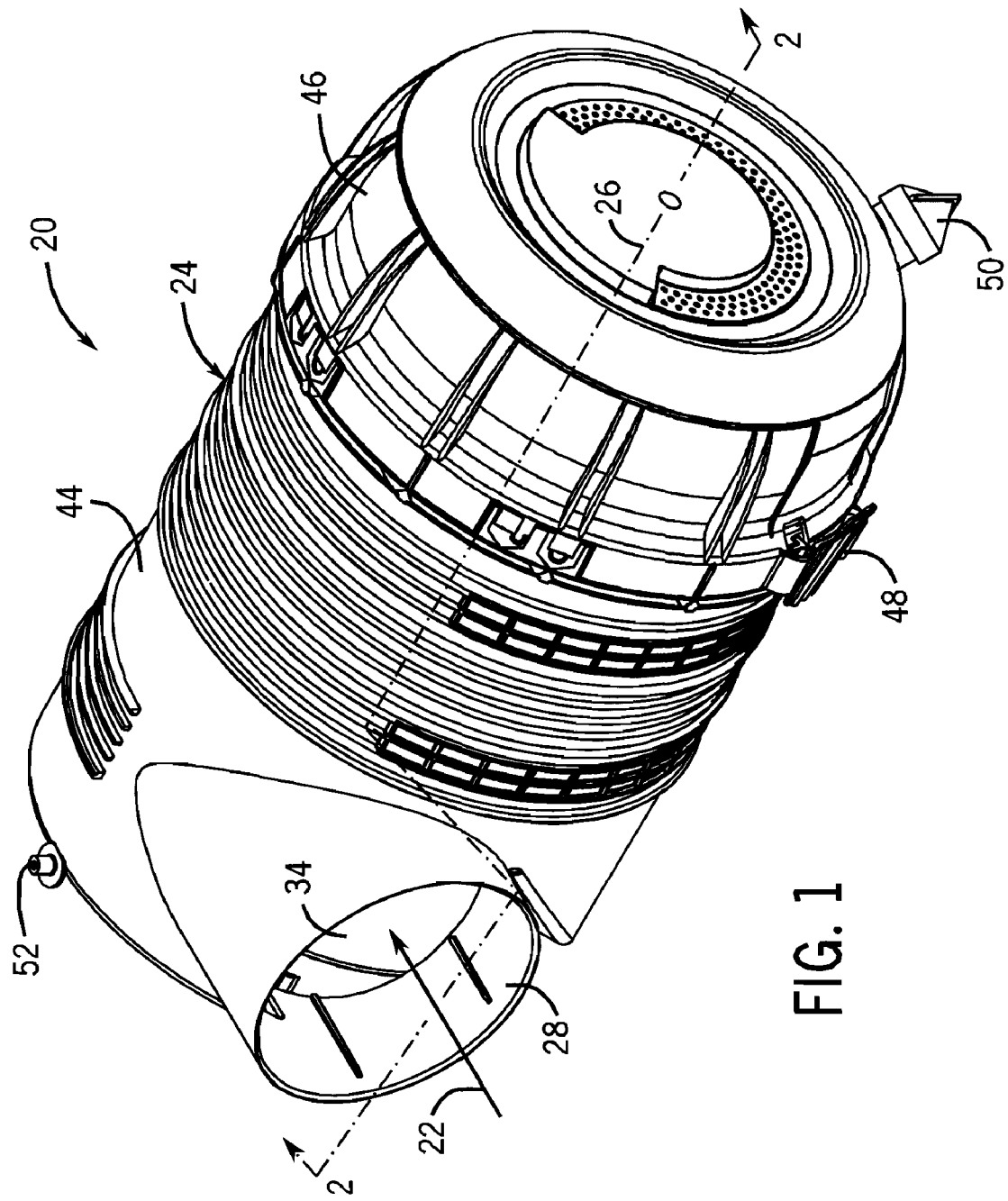
FIG. 1 is a perspective view of a filter housing which may house a filter element in accordance with the present invention.

FIG. 1 shows a filter 20 for filtering a fluid as shown at incoming arrow 22, e.g. air or other fluids. In the case of air, the filter is an air cleaner including a cylindrical housing 24 extending axially along an axis 26 and having a tangential inlet 28 and having an outlet 30, FIG. 2 for discharging clean filtered air as shown at arrow 32, and for example as shown in U.S. Pat. No. 6,958,083, incorporated herein by reference. An annular filter element 34 in the housing receives dirty air from inlet 28 and delivers clean filtered air to outlet 30. Air entering housing 24 through tangential inlet 28 as shown at arrow 22 flows along an interior surface 36 of housing 24 in a helical spiral pattern and then flows through filter element 34 including first and second subelements 38 and 40, to be described, into hollow interior 42 and then flows axially leftwardly in FIG. 2 through outlet 30 as shown at arrow 32. Housing 24 is typically a two-piece plastic assembly provided by an upper housing section 44 and a lower housing section 46, as in the noted incorporated '083 patent, and joined by a twist and lock structure 48, for example as shown in U.S. Pat. No. 6,402,798, incorporated herein by reference. Lower section 46 may have a dust ejection purge valve 50 for periodically discharging collected particulate due to the precleaning provided by the centrifugal separation afforded by the noted helical pattern, as is known, for example in the noted incorporated '083 patent. A pressure tap 52 may be provided at outlet 30 for monitoring the pressure thereat, for in turn monitoring pressure drop across the filter, as is known.

Figure 2:
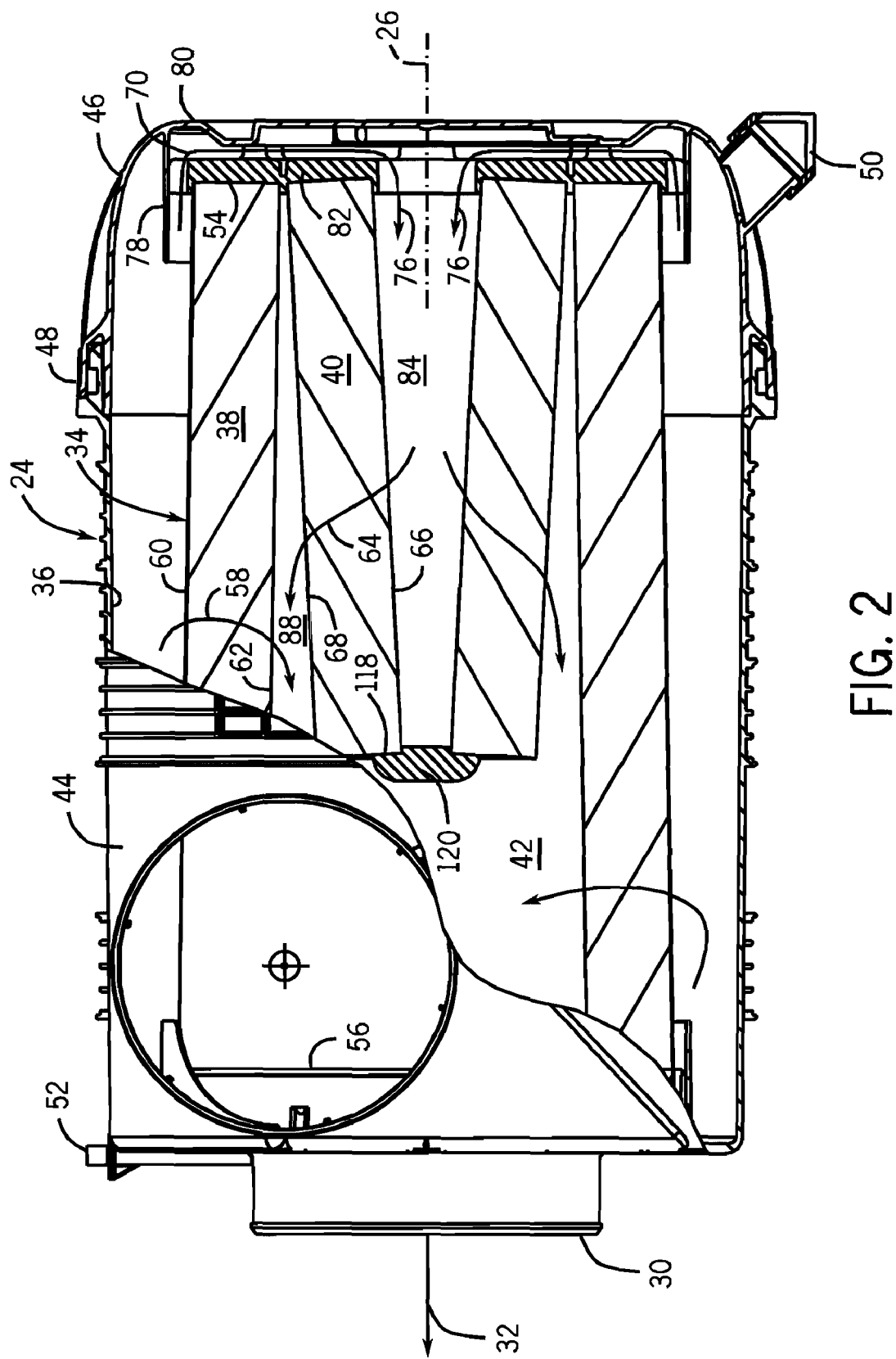
FIG. 2 is a sectional view taken along line 2-2 of FIG. 1.

Filter element 34, FIG. 2, extends axially along axis 26 between distally opposite first and second axial ends 54 and 56. The filter element includes a first subelement 38 having a first flow path 58 therethrough from a first upstream face 60 to a first downstream face 62, and a second subelement 40 having a second flow path 64 therethrough from a second upstream face 66 to a second downstream face 68. Each subelement is preferably an annular member, and subelement 38 may taper slightly radially inwardly as it extends axially rightwardly in FIG. 2, and subelement 40 may be a frusto-conical member tapering radially inwardly as it extends axially leftwardly in FIG. 2. Flow paths 58 and 64 are in parallel with each other from inlet 28 to outlet 30. Second flow path 64 has an upstream portion 70, FIGS. 2-4, flowing axially rightwardly at 72 along the noted first upstream face 60 then radially inwardly at 74 along the noted first axial end 54 of the filter element then axially leftwardly at 76 along the noted second upstream face 66. The flow at 72 is between the filter element and an annular flange 78 extending axially leftwardly from the axial end 80 of housing section or cover 46. The flow at 74 is between the axial end 54 of the filter element at endcap 82 and axial end 80 of housing cover section 46, with guide structure provided along path 74, to be described. The flow at 76 is into hollow interior 84 of subelement 40.

First and second downstream faces 62 and 68 face each other. First and second upstream faces 60 and 66 face away from each other. First flow path 58 through first subelement 38 is along a first direction, namely radially inwardly. Second flow path 64 through second subelement 40 is along a second direction, namely radially outwardly. The noted second direction is opposite to the noted first direction. First and second downstream faces 62 and 68 face each other across a common gap 88 preferably along a rectilinear line therebetween. First and second flow paths 58 and 64 merge with each other in gap 88. Upstream portion 70 of second flow path 64 defines a U-shape around common gap 88. The U-shape has first and second legs 72 and 76 and a bight 74 therebetween. First leg 72 is radially spaced from common gap 88 by first subelement 38 therebetween. Bight 74 is axially spaced from common gap 88 by axial end 54 of the filter element therebetween. Second leg 76 is radially spaced from common gap 88 by second subelement 40 therebetween.

Figure 3:
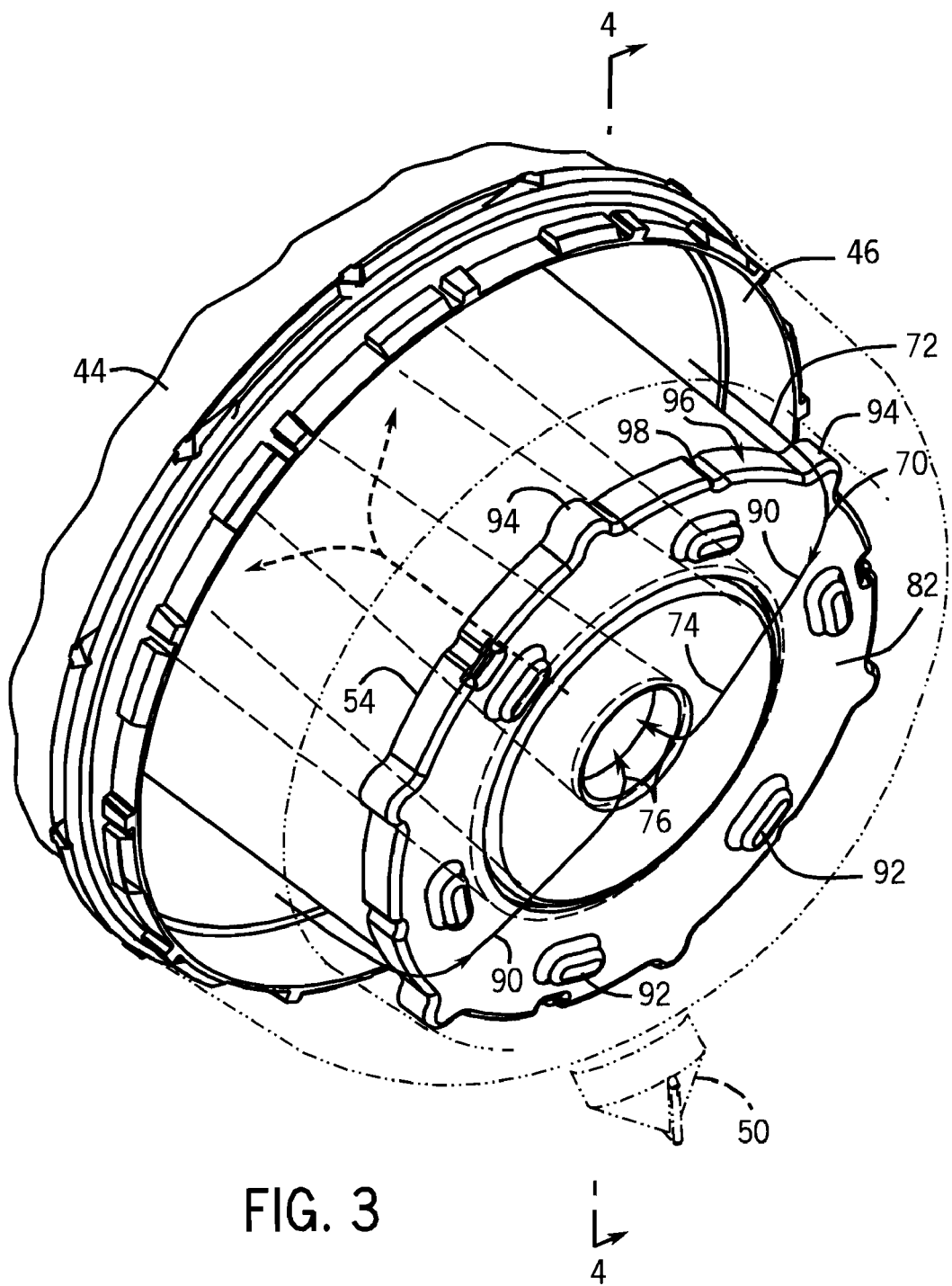
FIG. 3 is a perspective view of a portion of FIG. 1 with the housing cut away.
Figure 4:
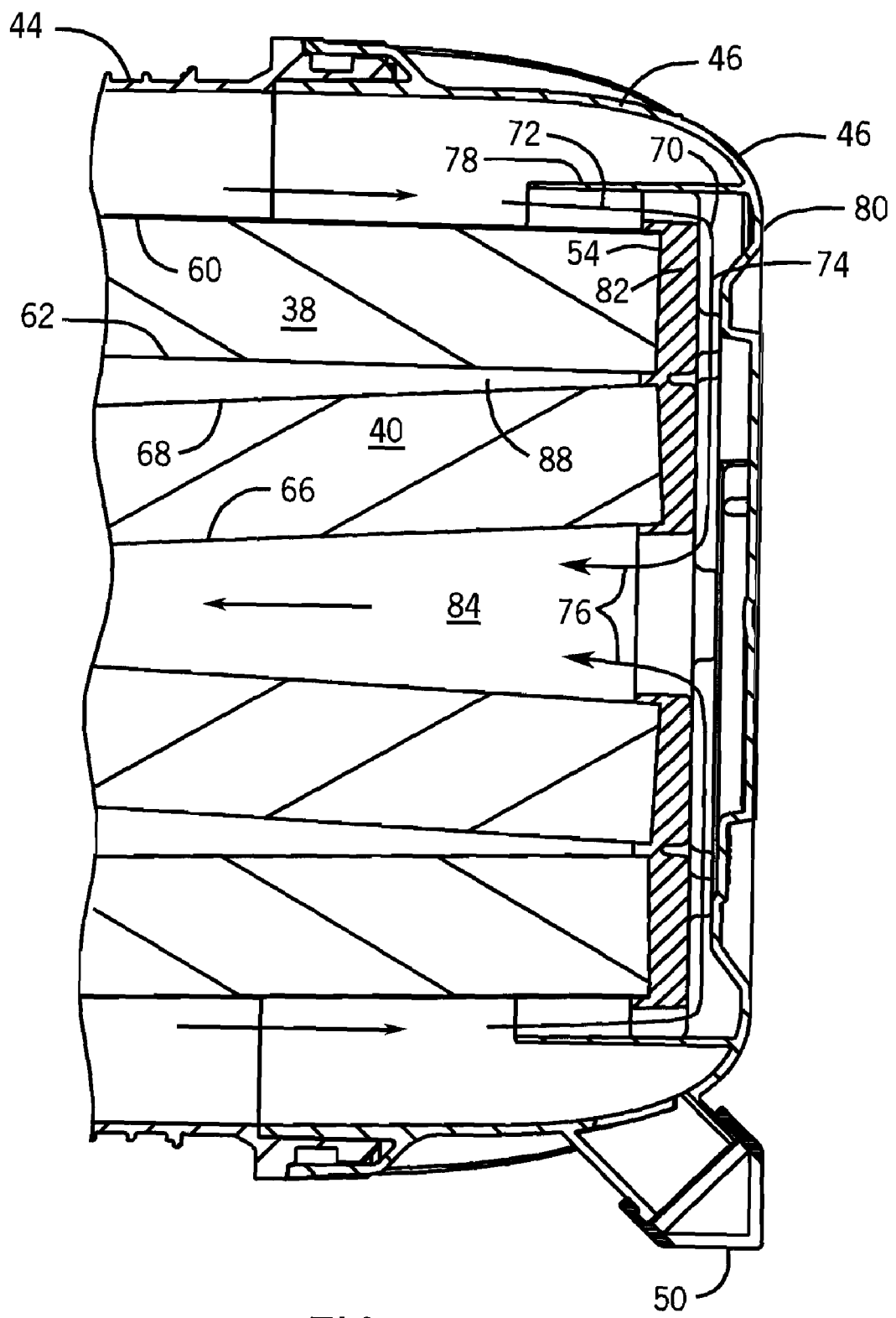
FIG. 4 is a sectional view taken along line 4-4 of FIG. 3.

In the construction of FIGS. 2-4, endcap assembly 82 at first axial end 54 has radial guide channels therealong providing radial flow passages at 74 from first upstream face 60 to second upstream face 66. First and second subelements 38 and 40 are attached to each other with a common endcap 82, e.g. urethane or the like, providing the noted endcap assembly. The endcap assembly includes a plurality of axially extending standoffs 92 providing a respective plurality of radial flow passages 90 therebetween. The endcap assembly may also include a plurality of radially extending standoffs 94 providing a respective plurality of axial flow passages 96 therebetween from first upstream face 60 to the plurality of radial guide channels 90. The endcap assembly may further include a plurality of grooves 98 along axial flow passages 96 for additional axial flow.

Figure 5:
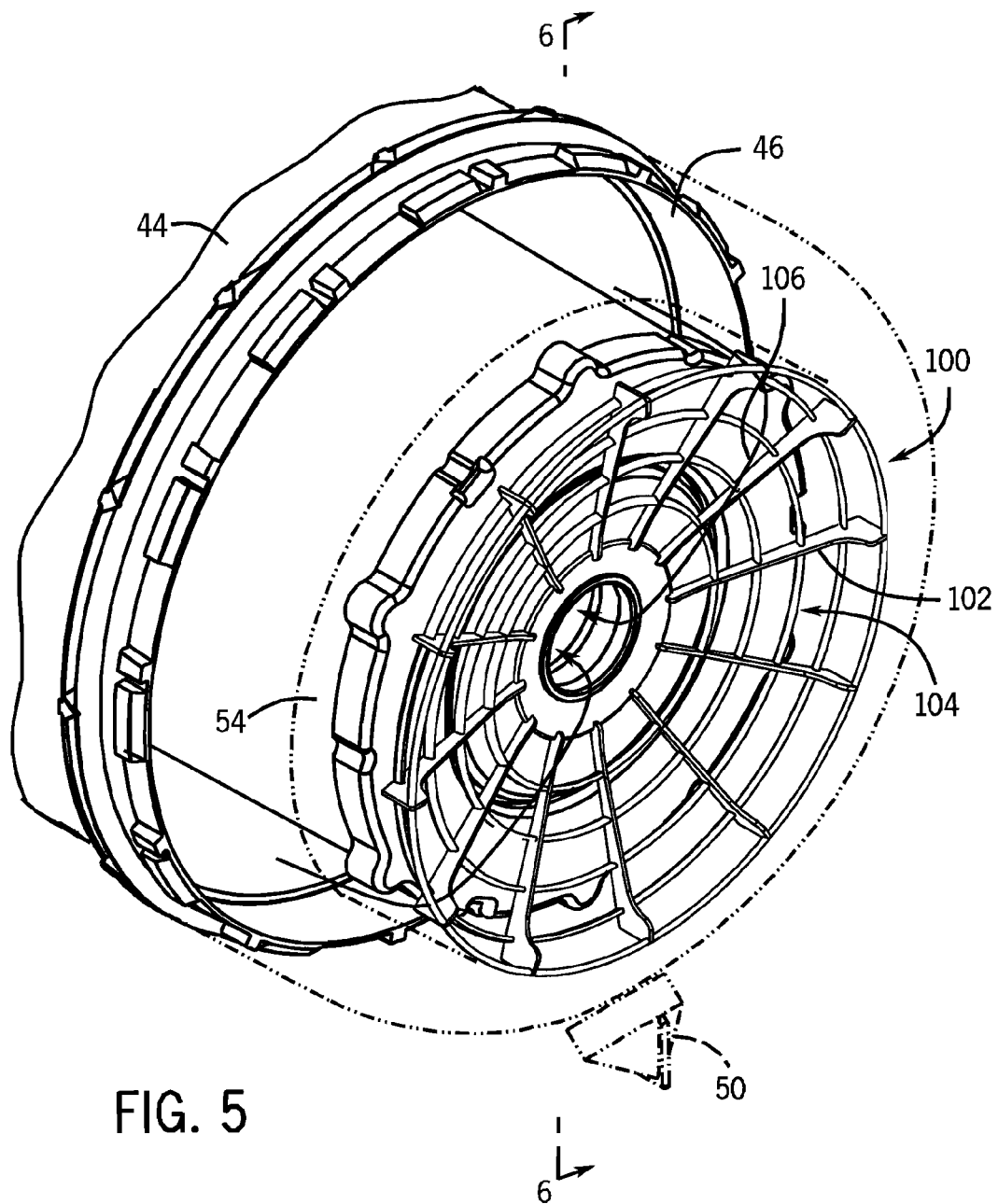
FIG. 5 is like FIG. 3 and shows another embodiment.
Figure 6:
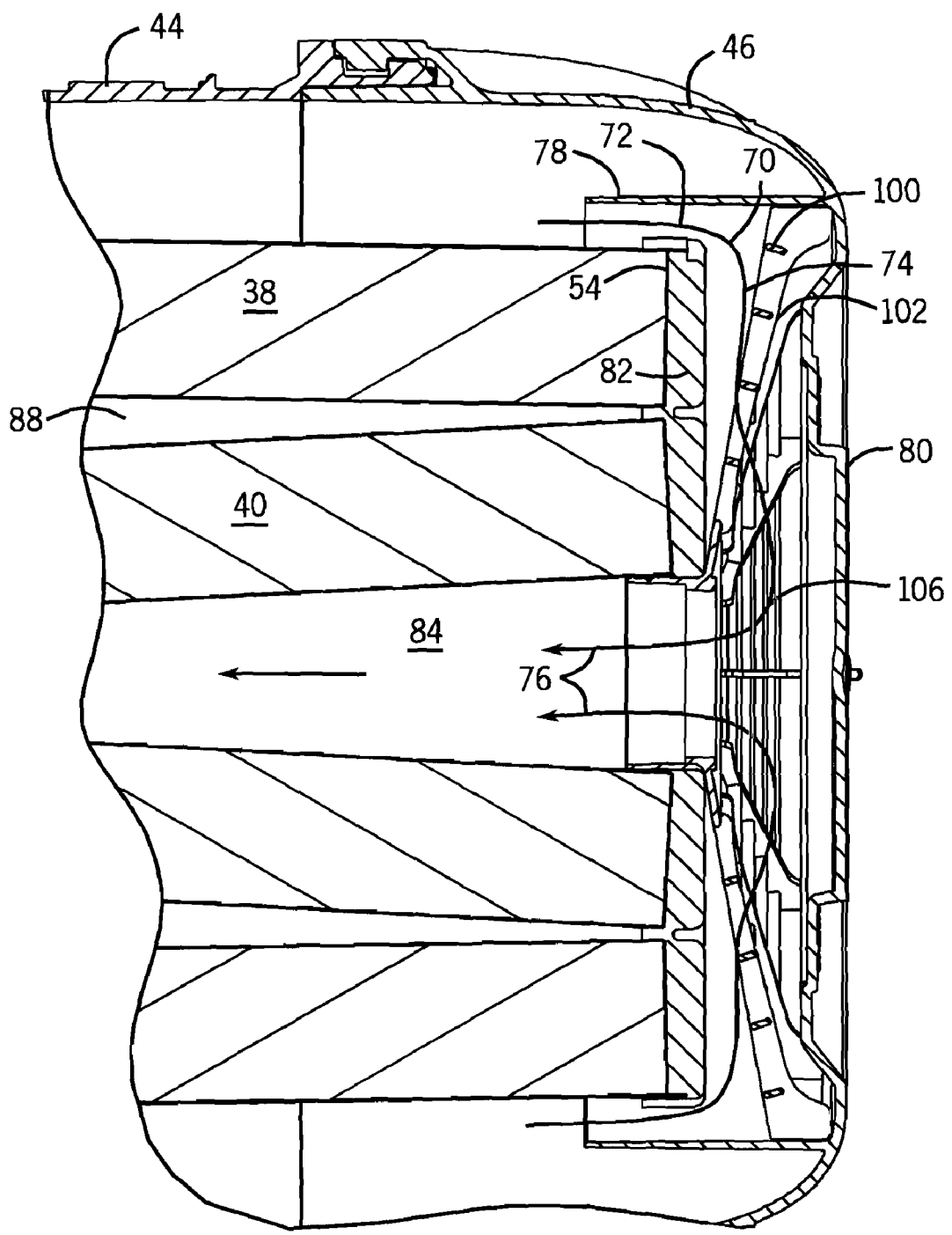
FIG. 6 is a sectional view taken along line 6-6 of FIG. 5.

FIGS. 5-6 show another embodiment and use like reference numerals from above where appropriate to facilitate understanding. The noted endcap assembly includes a perforated cage 100 extending from the noted first axial end 54. The perforated cage includes a sidewall 102 extending axially and radially along a taper from first axial end 54. The flow path at 74 passes through the perforations or openings or louvers or slots 104 of the cage as shown at 106.

Figure 7:
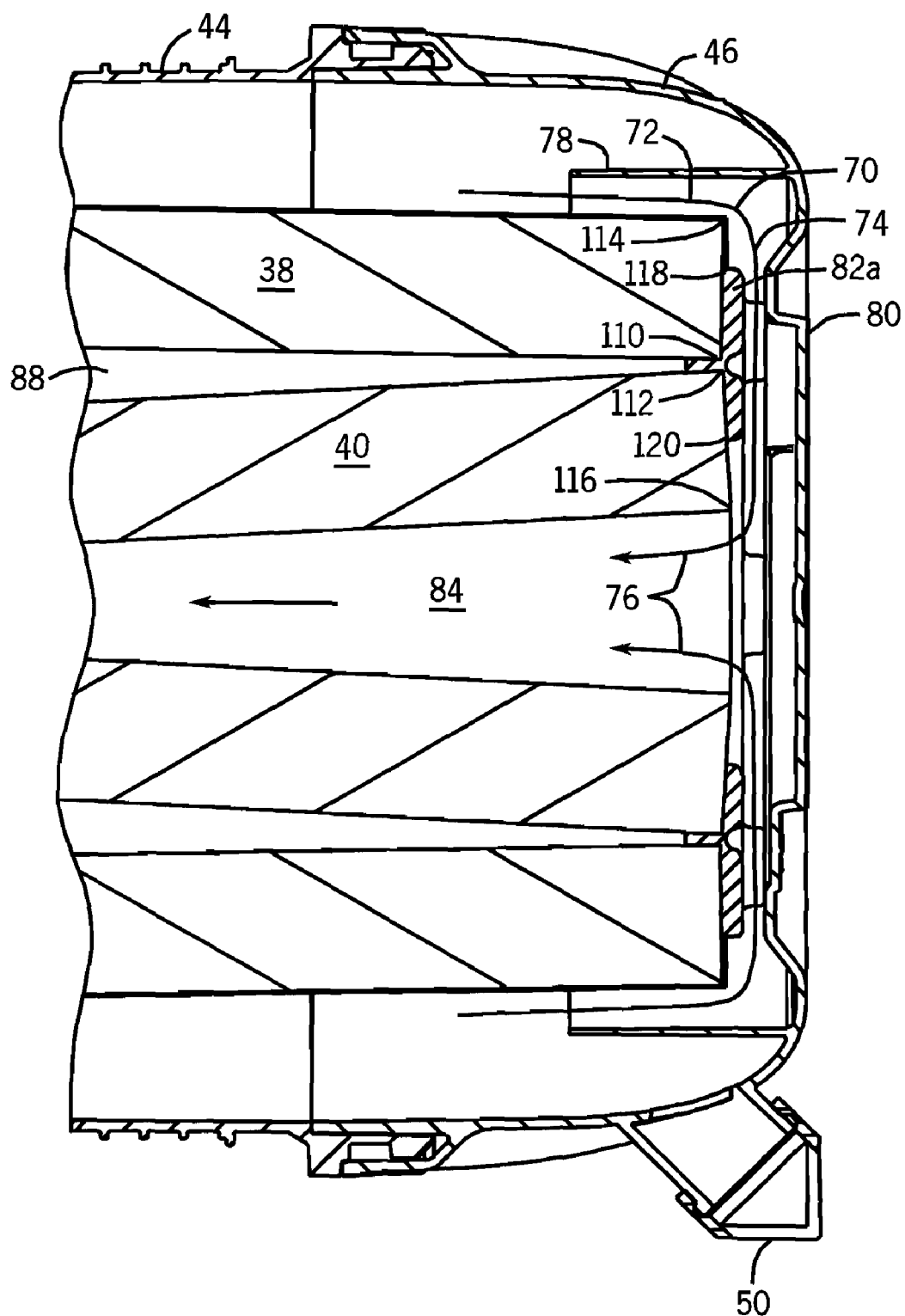
FIG. 7 is like FIG. 4 and shows another embodiment.

In one embodiment, each of subelements 38 and 40 includes pleated filter media having a plurality of pleats in a closed loop having an outer perimeter defined by a plurality of outer pleat tips, and an inner perimeter defined by a plurality of inner pleat tips, for example as shown by the following incorporated U.S. Pat. Nos.: 6,261,334; 6,383,244; 6,391,076; 6,416,561; 6,511,599; 6,641,637. In one embodiment, common endcap 82 spans radially across the entire axial end of each subelement and covers the inner and outer pleat tips of each, FIGS. 4, 6. In another embodiment, FIG. 7, which uses like reference numerals from above to facilitate understanding, common endcap 82*a* covers the inner pleat tips 110 of first subelement 38 and the outer pleat tips 112 of second subelement 40, but not the outer pleat tips 114 of first subelement 38 nor the inner pleat tips 116 of second subelement 40. Common endcap 82*a* has an outer perimeter 118 less than the outer perimeter of outer pleat tips 114 of first subelement 38. Common endcap 82*a* has an inner perimeter 120 greater than the inner perimeter of inner pleat tips 116 of second subelement 40. This embodiment enables use of alternate pleat sealing as in the above noted incorporated patents, including U.S. Pat. No. 6,391,076, allowing the ends of the filter to have open pleat tips, including the end of the outer subelement 38, to reduce restriction to flow around the axial end of the filter element at 74, which in turn reduces overall restriction and increases the utilization of subelement 40. The other axial end of second subelement 40 at 112 is closed by endcap 82*a* which may likewise only extend partially along the axial ends of the pleats to again take advantage of the noted alternate pleat sealing technology of the noted incorporated patents, though endcap 82*a* may extend radially across the entire span between the inner and outer pleat tips of subelement 40.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A filter element extending axially along an axis between distally opposite first and second axial ends, and comprising a first subelement having a first flow path therethrough from a first upstream face to a first downstream face, and a second subelement having a second flow path therethrough from a second upstream face to a second downstream face, said first and second flow paths being in parallel with each other, an end cap assembly at said first axial end and providing a plurality of radial flow passages from said first upstream face to second upstream face, wherein said end cap assembly comprises a cage extending axially and radially along a taper from said first axial end and having a plurality of circumferential louvers providing said radial flow passages, said louvers being spaced from each other along said taper.

* * * * *